United States Patent [19]

Nishikawa

[11] 4,250,928
[45] Feb. 17, 1981

[54] DEVICE FOR HOLDING NESTED PIPES TO ONE ANOTHER

[75] Inventor: Munehiro Nishikawa, Ichikawa, Japan

[73] Assignee: Kubota, Ltd., Osaka, Japan

[21] Appl. No.: 94,367

[22] Filed: Nov. 15, 1979

[30] Foreign Application Priority Data

May 2, 1979 [JP] Japan .................................. 54-54544
May 2, 1979 [JP] Japan .................................. 54-54545
May 2, 1979 [JP] Japan .................................. 54-54546

[51] Int. Cl.³ .......................... F16L 9/18; F16L 11/00
[52] U.S. Cl. ..................................... 138/113; 16/1 R; 138/114; 206/821; 403/12; 410/32; 410/47

[58] Field of Search ................. 138/113, 114, 90, 149; 24/256, 116 A; 285/133 R; 248/544; 206/821; 403/12; 16/1 C, 1 R; 410/32, 33, 34, 35, 36, 38, 39, 40, 41, 42, 43, 45, 46, 47, 48

Primary Examiner—Steven L. Stephan
Attorney, Agent, or Firm—Joseph W. Farley

[57] ABSTRACT

A device for holding nested pipes to one another radially and axially thereof each at one end, comprising a substantially U-shaped hook member engageable with axially opposite side faces of an inner flange on one end of an outer pipe and also engageable at its bottom with an outer peripheral shoulder portion of one end of an inner pipe, an engaging member engageable with one end face of the inner pipe, and screw means for fastening these two members to each other. Like the hook member, the engaging member is preferably U-shaped. For holding at least three pipes together, an engaging member substantially resembling the hook member is used for the intermediate pipe.

12 Claims, 25 Drawing Figures

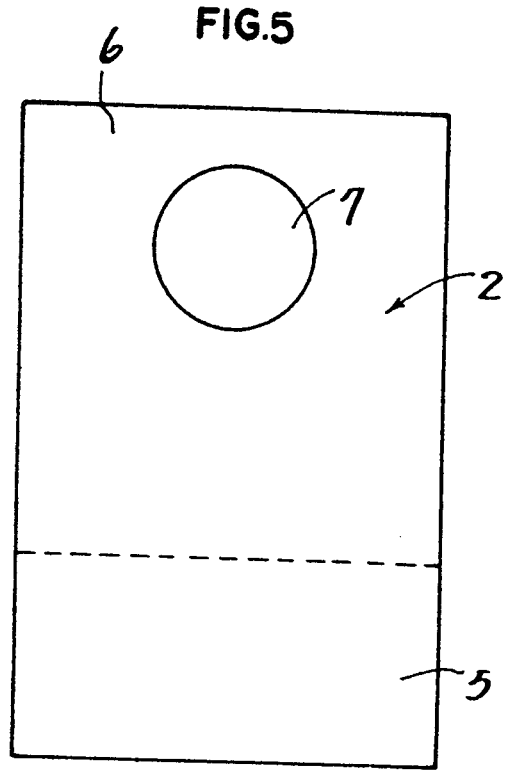
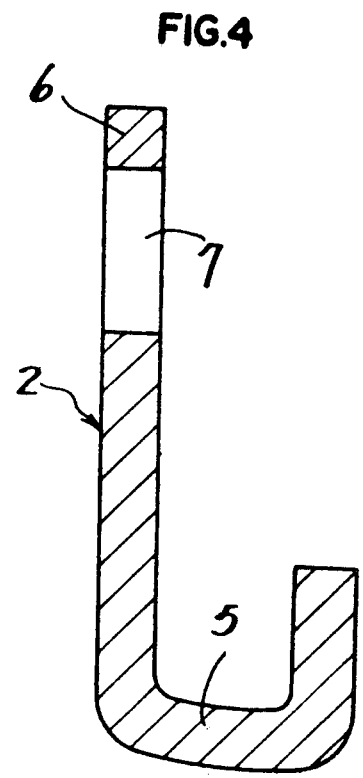
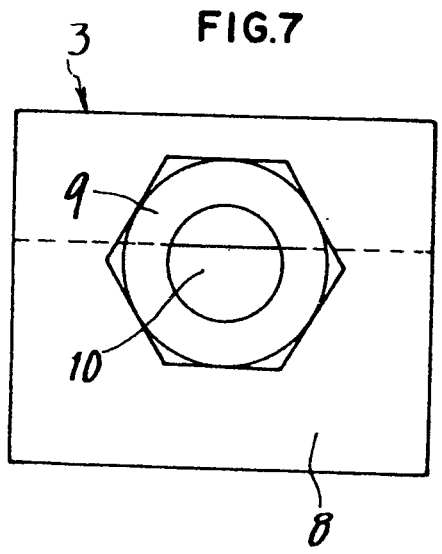
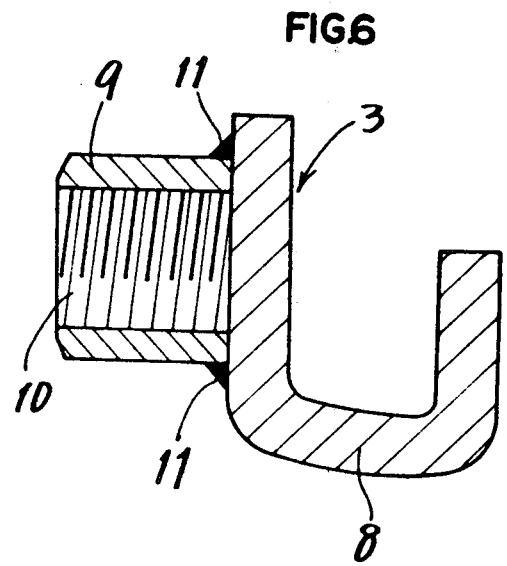

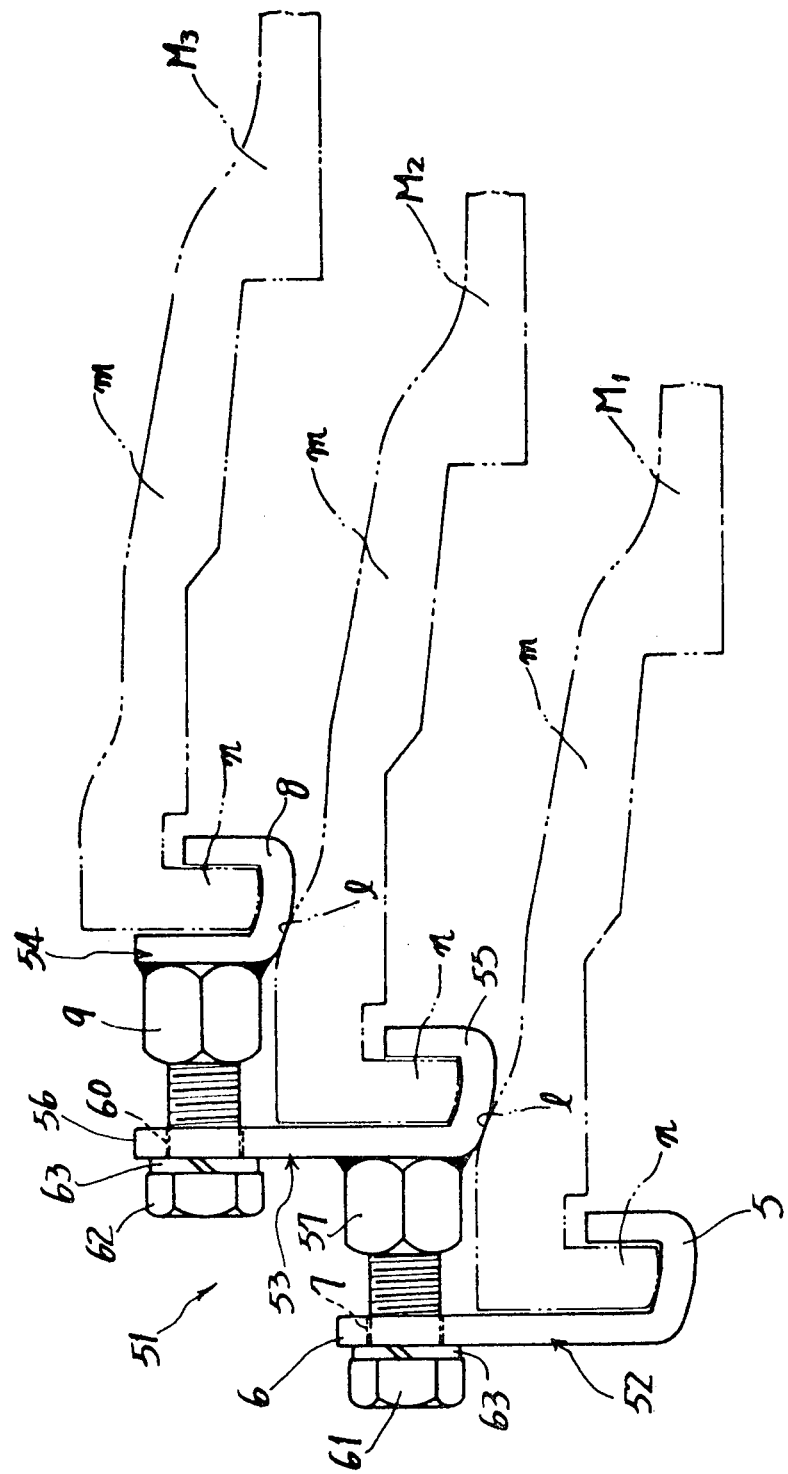

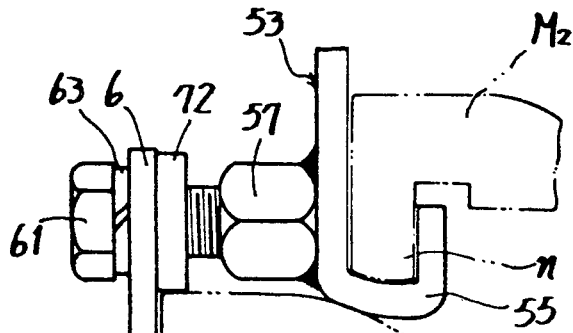
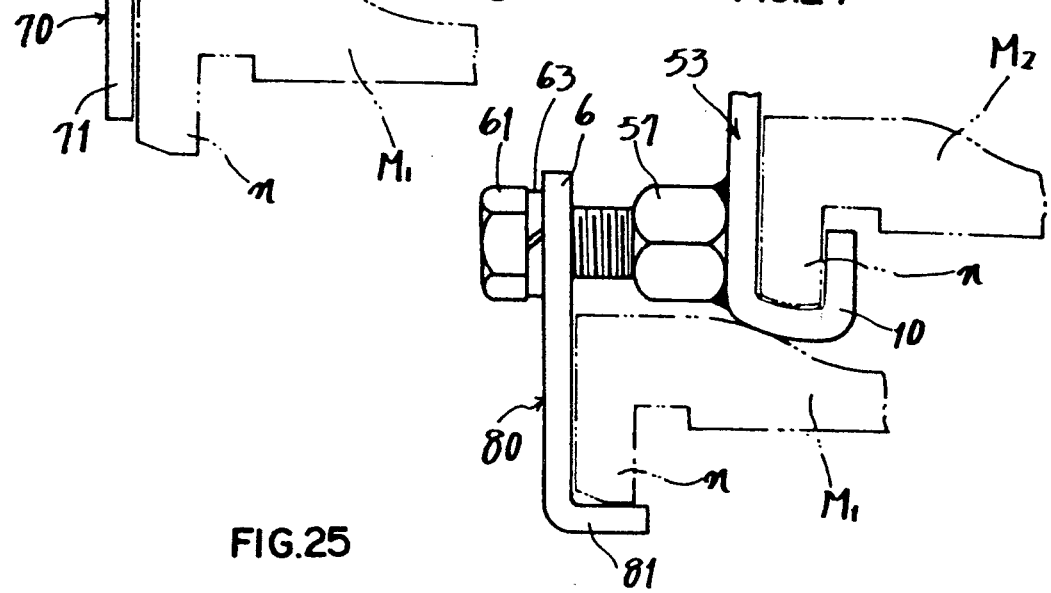
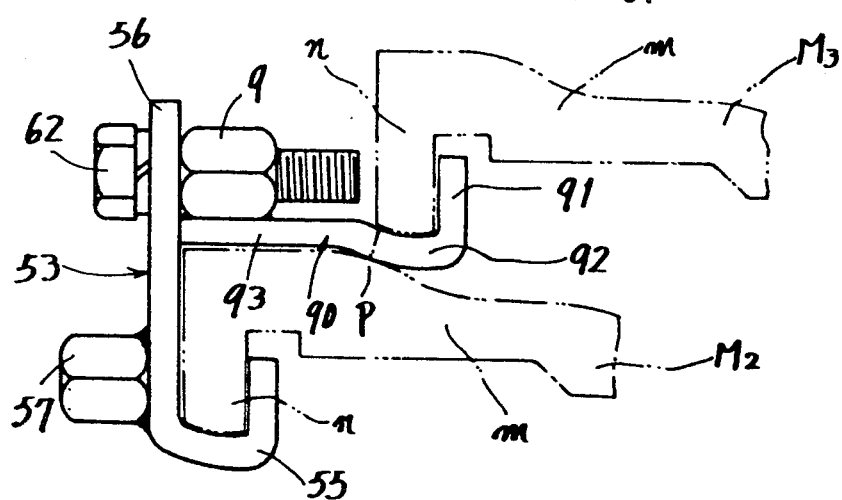

DEVICE FOR HOLDING NESTED PIPES TO ONE ANOTHER

The present invention relates to a device for holding nested pipes to one another each at one end.

When nested, pipes of varying diameters can be transported with effective use of the loading space. This method of transport is also very advantageous because small-diameter pipes act to reinforce pipes of larger diameter against deformation.

When thus nested for transport, the pipes must be held to one another at least diametrically thereof. For this purpose, spacers are usually placed in the annular spaces between the pipes. The use of spacers alone nevertheless fails to effectively restrain the pipes from axial displacement relative to one another, presenting difficulty in loading and unloading the transport means.

Accordingly it has been attempted to hold the pipes to one another with a jig attached to the pipe ends diametrically thereof, but the device is of large size and requires a high material cost. Further when the nested pipes diametrically differ from one another by a small amount, the sockets of the pipes interefere with one another diametrically thereof, so that the socket ends of the nested pipes are not flush with one another. In such a case, extreme diffficulty is encountered in holding the pipes to one another.

The main object of this invention is to provide a device for holding pipes to one another each at one end when they are nested with a small difference in diameter from one another such that the sockets of the pipes are positioned close to one another or diametrically interfere with one another, whereby the nested pipes can be effectively restrained against diametrical or axial displacement from one another although the device is small-sized and easy to attach.

To fulfil this object, the invention provides a holding device comprising a hook member having a bent portion engageable with an inner flange on one end of an outer pipe from opposite sides axially thereof and also engageable with an outer peripheral shoulder portion of an inner pipe, and engaging member at least engageable with one end face of the inner pipe and screw means for fastening the hook member and the engaging member to each other.

With this construction, the outer pipe and the inner pipe can be restrained from moving relative to each other axially of the pipes by the hook member and the engaging member which are fastened to each other, and the pipes can be held to each other also diametrically thereof by the bent portion of the hook member. Moreover the device is of small size, can be made at a low material cost and easy to fit in place.

According to a preferred embodiment of the invention, there is provided retaining means for preventing the engaging member from turning inadvertently against disengagement from one end face of the inner pipe. The retaining means comprises a retaining member fixedly joined to the engaging member engageable at its one edge with an outer peripheral portion of one end of the inner pipe when the engaging member is in engagement with the end face of the inner pipe. Alternatively the retaining means comprises a lug formed by bending the free end of the engaging member and engageable with the inner periphery of the inner flange of the inner pipe. The engaging member, like the hook member, can be provided with a bent portion, which assures the engagement of the engaging member with the inner pipe with improved effectiveness.

According to another preferred embodiment, there is provided a holding device by which an outer pipe, at least one intermediate pipe and an inner pipe can be held together as nested.

The holding device comprises a hook member similar to the hook member described above and engageable with the outer pipe, a first engaging member at least engageable with one end face of the intermediate pipe and with an outer peripheral shoulder portion of one end of another intermediate pipe positioned inside the intermediate pipe or of the inner pipe, a second engaging member similar to the first-mentioned engaging member and engageable with the inner pipe, and screw means for fastening together each two immediately adjacent members of the hook member and the first and second engaging members.

Preferably each of the first and second engaging members, like the first-mentioned engaging member, is provided with retaining means. It is especially advantageous that the first engaging member be formed with a bent portion engageable with the inner flange on the intermediate pipe from opposite sides to ensure engagement with improved reliability because the first engaging member for engaging the intermediate pipe is adapted to fixedly support the second engaging member for engaging the inner pipe.

To facilitate the attachment of the holding device to the pipes, the first engaging member is fixedly provided with one element of the screw means for fastening together the first engaging member and the engaging member for engaging one end face of the pipe which is positioned inside the pipe engaged by the first engaging member.

Various other features and advantages of the invention will be readily understood from the following description of the preferred embodiments given with reference to the accompanying drawings, in which:

FIGS. 3 to 7 show a first embodiment of this invention;

FIG. 3 is a side elevation of the embodiment;

FIG. 4 is a sectional view showing a hook member for an inner pipe;

FIG. 5 is a front view of the same;

FIG. 6 is a sectional view showing a hook member for an outer pipe;

FIG. 7 is a front view of the same;

FIG. 9 is a side elevation of the same; FIG. 10 is an enlarged side elevation of the same;

FIG. 11 is a plan view of the same;

FIGS. 18 to 21 show a third embodiment of the invention;

FIG. 18 is a front view showing nested pipes as held together by the holding devices;

FIG. 19 is a view in vertical section showing the same;

FIG. 20 is a side elevation showing the holding device;

FIG. 21 is a sectional view showing a hook member for an intermediate pipe;

FIG. 23 is a side elevation showing a modification of the third embodiment to illustrate the relation between a hook member for an inner pipe and a hook member for an intermediate pipe;

FIG. 24 is a side elevation showing another modification; and

FIG. 25 is a side elevation showing another modification of the third embodiment to illustrate the relation between a hook member for an intermediate pipe and a hook member for an outer pipe.

Figure 1:
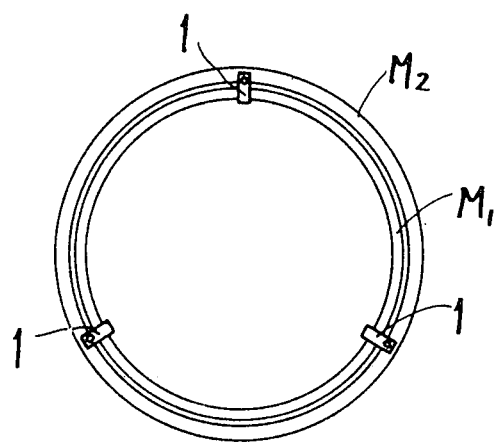
FIG. 1 is a front view showing nested pipes having holding devices of this invention attached thereto.
Figure 2:
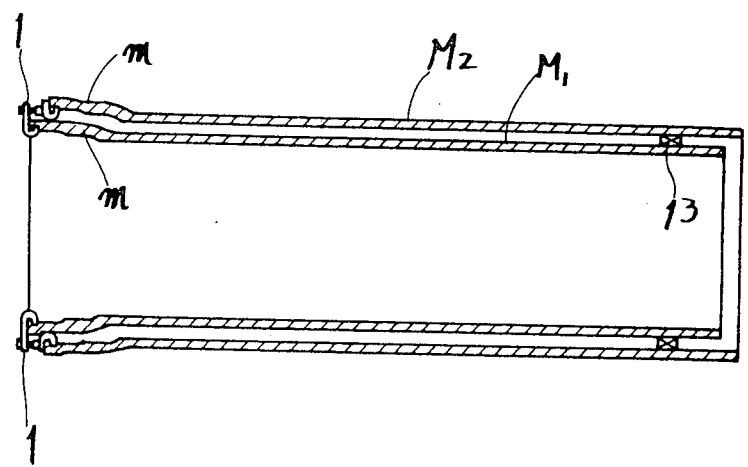
FIG. 2 is a view in vertical section of FIG. 1.
Figure 3:
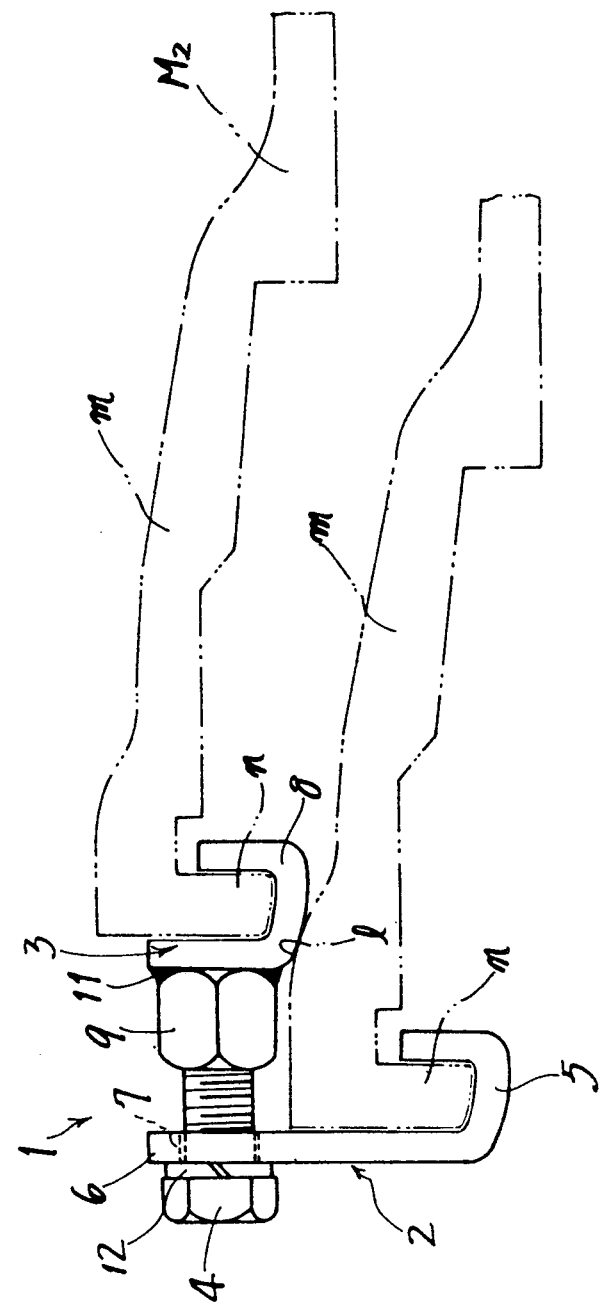

With reference to FIGS. 1 to 3, a holding device, a first embodiment of this invention, comprises a hook member 2 for an inner pipe $M_1$ of small diameter, a hook member 3 for an outer pipe $M_2$ of larger diameter fitting around the pipe $M_1$ and a bolt 4 for fastening these hook member 2 and 3 together. The pipes $M_1$ and $M_2$ are made of cast iron and each have a socket m at one end and an inner flange n at the inner peripheral edge of the end. The flanged ends of the nested pipes are slightly displaced from each other. The hook member 2 has a U-shaped bent portion 5 engageable with opposite side surfaces of the flange n of the inner pipe $M_1$ and and extension 6 extending from one of the opposed ends of the bend portion 5 radially outward beyond the outer peripheral edge of the inner pipe $M_1$. The extension 6 has a hole 7 (FIGS. 4 and 5). The other hook member 3 has a U-shaped bent portion 8 engageable with opposite side surfaces of the flange n of the outer pipe $M_2$ and having a boss portion 9 on one side surface thereof. The boss portion 9 has a threaded bore 10 extending axially of the pipe and is in the form of a nut welded as at 11 to the bent portion 8 (FIGS. 6 and 7). The bolt 4 is passed through the hole 7 and screwed into the threaded bore 10. Indicated at 12 is a washer.

The holding device 1 of the above construction is used in the following manner. Conveniently the device 1 is installed when nesting the pipes $M_1$ and $M_2$. At least three holding devices 1 are arranged on the pipes as spaced apart circumferentially thereof. The pipes $M_1$ and $M_2$ are nested, for example, by placing the inner pipe $M_1$ on a suitable cantilever support arm and and causing a carriage or the like supporting the outer pipe $M_2$ thereon to fit the pipe $M_2$ around the pipe $M_1$. At this time, when the socket end of the outer pipe $M_2$ reaches a position close to the socket end of the inner pipe $M_1$, the hook member 3 is engaged with the inner flange n of the outer pipe $M_2$ and temporarily held thereto with adhesive tape, magnet member or the like. If the bent portion 8 of the hook member 3 is covered with resin sheets over the inner and outer surfaces, the sheets will protect the coating on the inner pipe $M_1$ and also serve to temporarily hold the hook member 3 by virtue of the elasticity of the sheets. The outer pipe $M_2$ is thereafter moved until the hook member 3 comes into contact with an outer peripheral shoulder portion 1 of the inner pipe $M_1$. Subsequently the hook member 2 is engaged with the flange n of the inner pipe $M_1$. The hook members 2 and 3 are fastened together with the bolt 4. Spacers 13 are placed between the outer and inner peripheries of the pipes $M_1$ and $M_2$ at a location near the other ends thereof, as suitably spaced apart circumferentially of the pipes. Rubber, wood or like pieces serve as the spacers 13.

With the holding device 1 thus attached to the pipes, the bent portion 8 of the hook member 3 is in engagement with opposite sides of the inner flange n on the outer pipe $M_2$ and with the outer peripheral shoulder portion l of the inner pipe $M_1$, while the bent portion 5 of the hook member 2 is partly in engagement with the socket end face of the inner pipe $M_1$, with the result that the pipes $M_1$ and $M_2$ can be held together effectively without any axial backlash. Additionally both the pipes, bearing against each other with the hook member 3 interposed therebetween, can be firmly supported radially thereof. Since the bent portion 5 of the hook member 2 is in engagement with the inner flange n of the inner pipe $M_1$, the hook member 2 can be held in place properly against turning that would lead to disengagement. The holding device is thus adapted to be attached to a portion of the pipe locally and is of small size, so that the device can be manufactured at an exceedingly lower material cost than heretofore possible.

Figure 8:
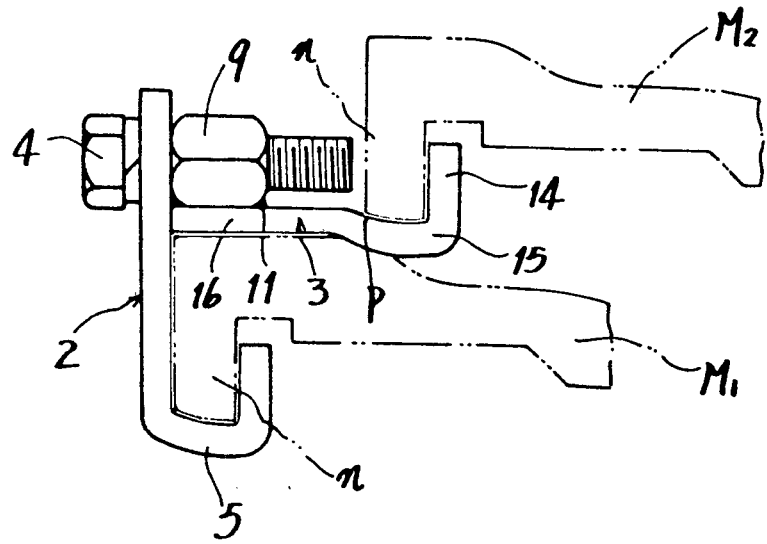
FIG. 8 is a side elevation showing a modification of the first embodiment.

FIG. 8 shows a modification of the first embodiment, including a hook member 3 for the outer pipe. The hook member 3 comprises an upright portion 14 radially extending along the inner side face of the flange n, a slightly bent portion 15 engageable with the inner periphery of the flange n and an extension 16 extending outward from the bent portion 15 axially of the pipe. A boss portion 9 is welded to the forward end of the extension 16. The hook member 3, although engaging the outer side face of the flange n only at an inner peripheral edge P, effectively restrains the pipes from axial displacement relative to each other. The bolt 4 is serviceable as a stopper if adapted to extend to a location close to the outer surface of the flange n as illustrated.

Figure 9:
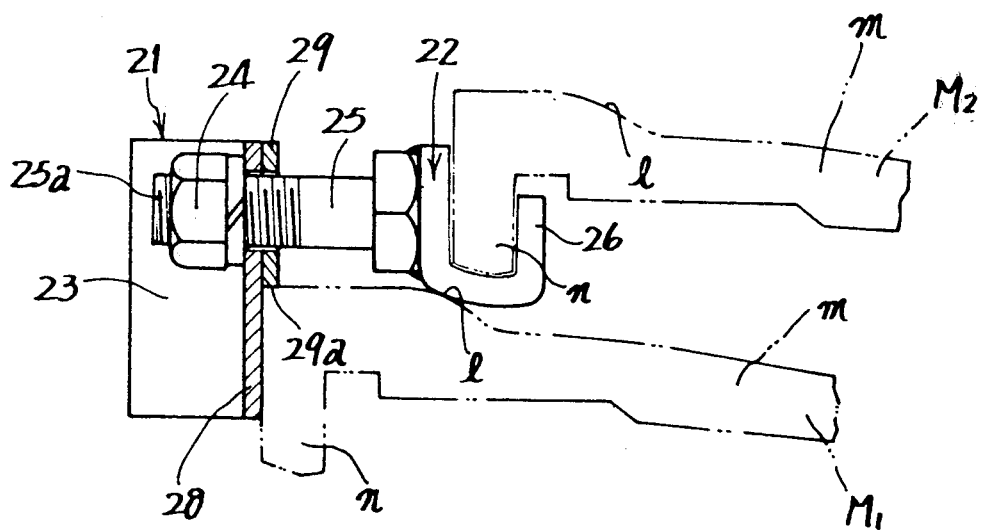
FIGS. 9 to 11 show a second embodiment of the invention.
Figure 10:
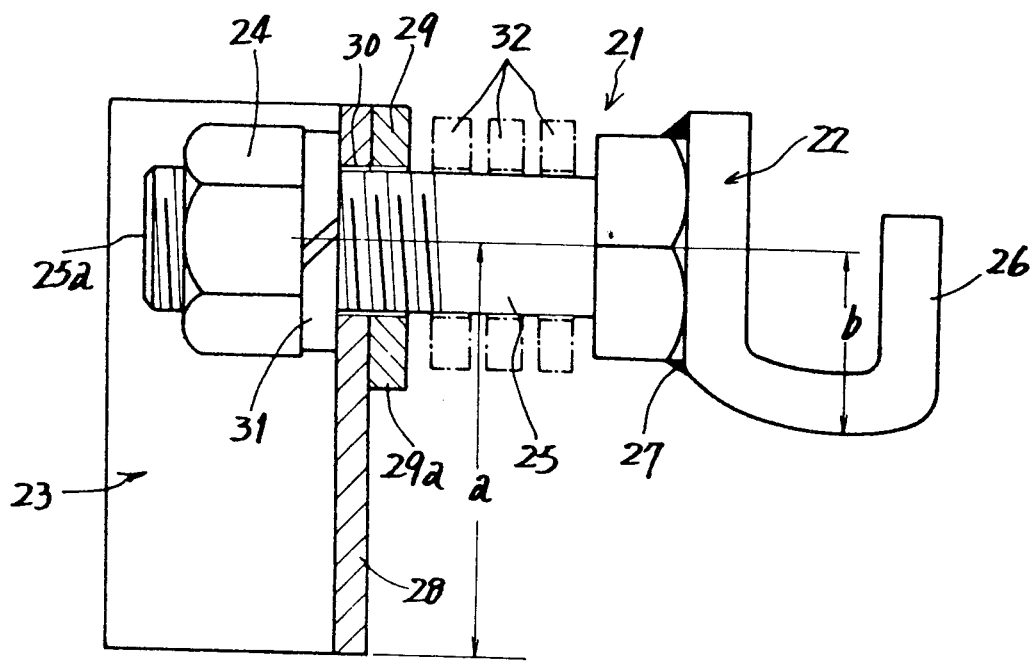
Figure 11:
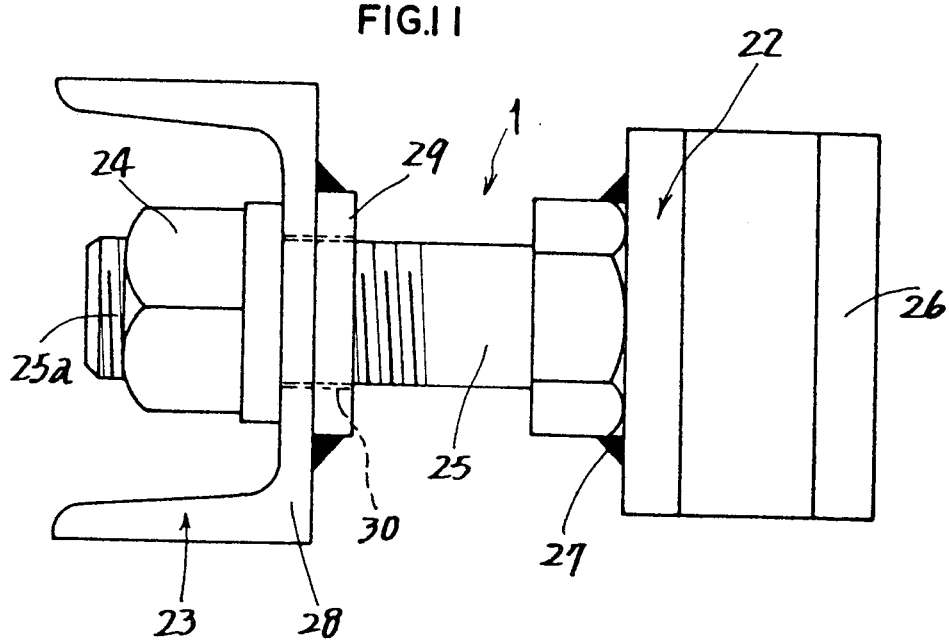
Figure 13:
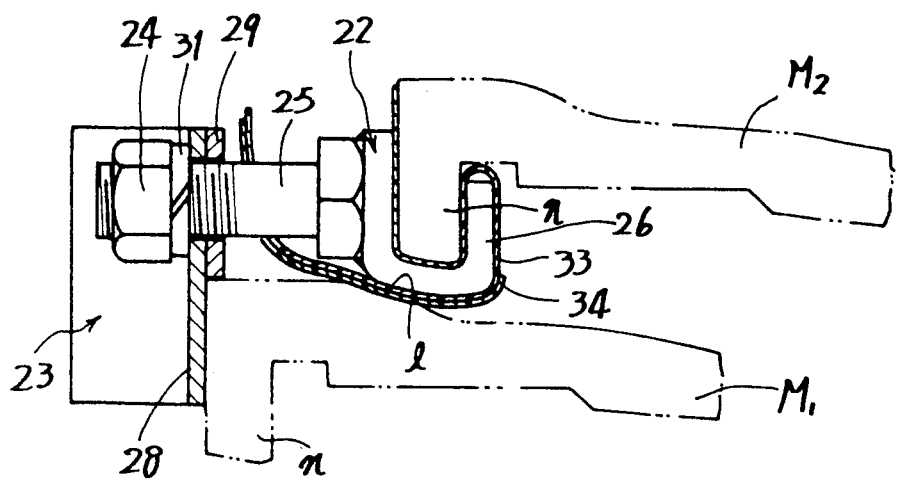
FIG. 13 is a side elevation partly in section and showing the holding device as it is installed with use of resin sheets for temporarily setting the hook member.
Figure 12:
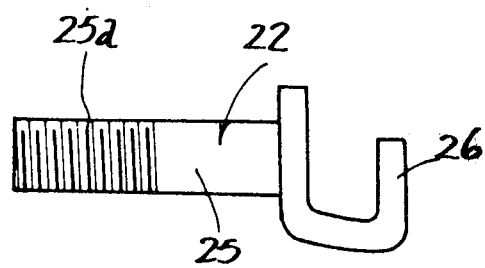
FIG. 12 is a modification of the hook member.

A second embodiment will now be described with reference to FIGS. 9 to 11. A holding device 21 comprises a hook member 22 engageable with the inner flange n on the outer pipe $M_2$, an engaging member 23 engageable with one end face of the inner pipe $M_1$ and a nut 24. The hook member 22 includes a bent portion 26 U-shaped and attached to one end of a rod 25. The rod 25 has at the other end thereof an externally threaded portion 25a engageable with the nut 24. In the illustrated embodiment, a commercial headed bolt is used as the rod 25, and a member providing the bent portion 26 is welded to the bolt as at 27. The rod 25 and the bent portion 26 may be in the form of an integral member as seen in FIG. 12.

The engaging member 23 comprises an abutting member 28 in the form of a short steel channel piece and a rectangular retaining plate 29 welded to the outer surface of the web of the abutting member 28. A hole 30 for passing the rod 25 of the hook member 22 is formed in the abutting member 28 and the plate 29. The abutting member 23 is adapted to bear against one end face of the inner pipe $M_1$. The distance a from the axis of the hole 30 to the lower end of the engaging member 23 is sufficiently larger than the distance b from the axis to the bottom face of the bent portion 26. The retaining plate 29 has an edge 29a adapted to contact the outer surface of the inner pipe $M_1$ and positioned slightly closer to the axis than the bottom face of the bent portion 26. The nut 24 is screwed on the rod 25 with a washer 31 interposed between the nut 24 and the engaging member 23. A desired number of spring washers 32 serving as distance pieces may be provided between the engaging member 23 and the engaging portion 26 of the hook member 22.

To use the holding device 21, the bent portion 26 of the hook member 22 is fitted to the inner flange n of the outer pipe $M_2$, and the engaging member 23 is placed in contact with one end face of the inner pipe $M_1$, with the rod 25 passed through the hole 30. At this time, the retaining plate 29 has its edge 29a positioned in contact with the outer surface of the inner pipe $M_1$. The nut 24 is thereafter tightened up to fasten the engaging member 23 to the hook member 22. Consequently the bent portion 26 of the hook member 22 is held in engagement with the inner flange n on the outer pipe $M_2$ from axially opposite sides, while the bottom of the bent portion 26 bears on an outer peripheral shoulder portion 1 of the inner pipe $M_1$, with the engaging member 23 in engagement with the end face of the pipe $M_1$. The device 1 therefore effectively restrains the pipes $M_1$ and $M_2$ against axial displacement from each other. The engagement of the retaining member 29 with the outer surface of the inner pipe $M_1$ prevents the engaging member 23 from turning on the rod 25. The abutting member 28 of the engaging member 23, when provided by a steel channel piece and not in the form of a mere flat plate, has sufficient strength and also protects the nut 24 from some other article.

If the bent portion 26 of the hook member 22 is covered with a resin sheet 33 over the inner and outer surfaces, with another resin sheet 34 covering the sheet 33 over the outer surface, the coating over the inner pipe $M_1$ can be protected effectively.

Figure 14:
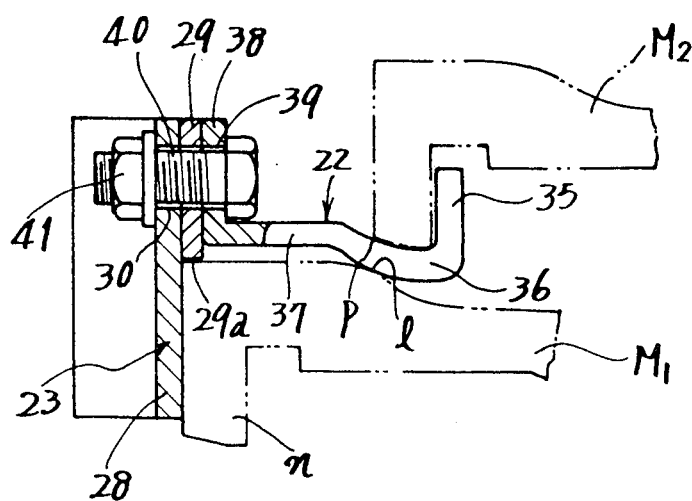
FIGS. 14 to 16 are side elevations respectively showing other modifications of the second embodiment.

FIG. 14 shows a modification (resembling the modification shown in FIG. 8 of the first embodiment) of the second embodiment. A hook member 22 is made of a plate and includes an upright portion 35, a slightly bent portion 36, an extension 37 extending outward from the bent portion 36 axially of the pipe and a connecting portion 38 extending upright from the forward end of the extension 37. The connecting portion 38 has a hole 39 corresponding to the hole 30 of the engaging member 23. A bolt 40 passed through the holes 30 and 30 and a nut 41 screwed on the bolt fasten the hook member 22 and the engaging member 23 together.

Figure 15:
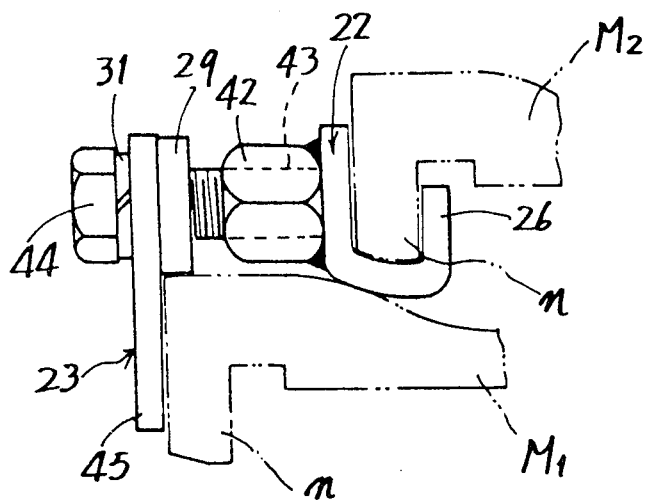

FIG. 15 shows another modification including a hook member 22 comprising a bent portion 26 and a boss portion 42. The boss portion 42 has a threaded bore 43. The boss portion 42 is provided by a nut welded to the bent portion 26. A bolt 44 is passed through a hole 30 (not shown) in an engaging member 23 and screwed into the bore 43 of the boss portion 42. The abutting member of the engaging member 23 comprises a planar plate 45 instead of a steel channel piece.

Figure 16:
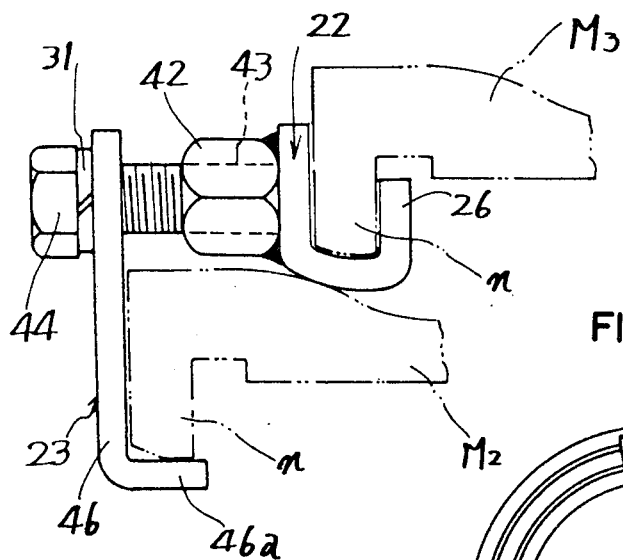

FIG. 16 shows still another modification comprising a hook member 22 similar to that shown in FIG. 15 and an engaging member 23 including an abutting member 46 having a lug 46a engageable with the inner periphery of the inner flange n of the inner pipe $M_1$. The engagement of the lug 46a with the pipe $M_1$ retains the engaging member 23 against turning.

Figure 17:
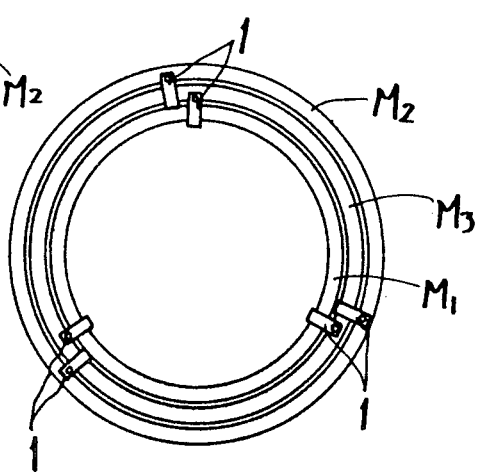
FIG. 17 is a front view showing another mode of attaching the holding devices.

Although the foregoing embodiments have been described as used for two nested pipes, three or more nested pipes can be similarly held together by using holding devices 1 for interconnecting each two immediately adjacent pipes of the outer pipe $M_2$, intermediate pipe(s) $M_3$ and inner pipe $M_1$ as illustrated in FIG. 17.

Figure 18:
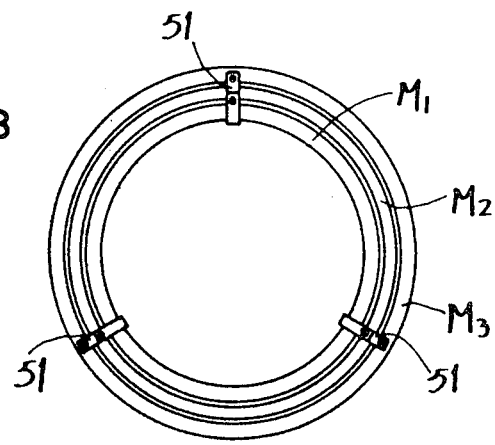
Figure 19:
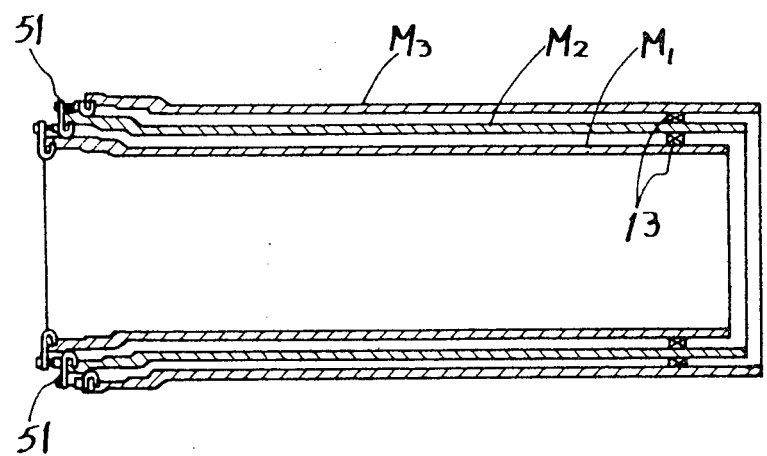
Figure 22:
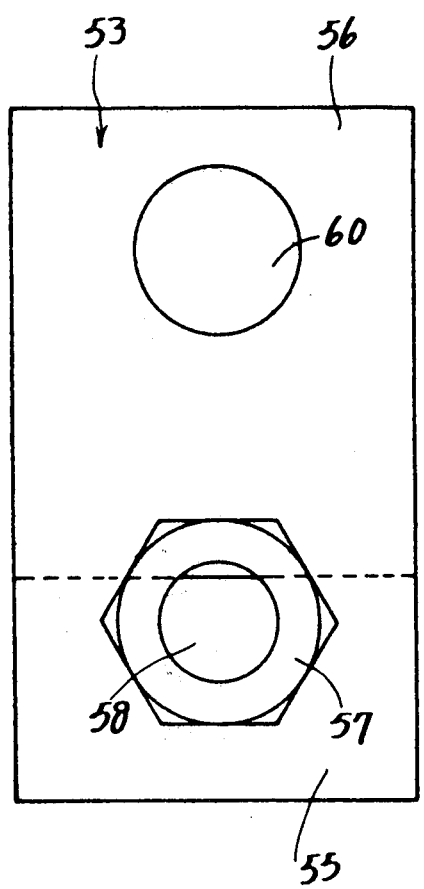
FIG. 22 is a front view showing the same.
Figure 21:
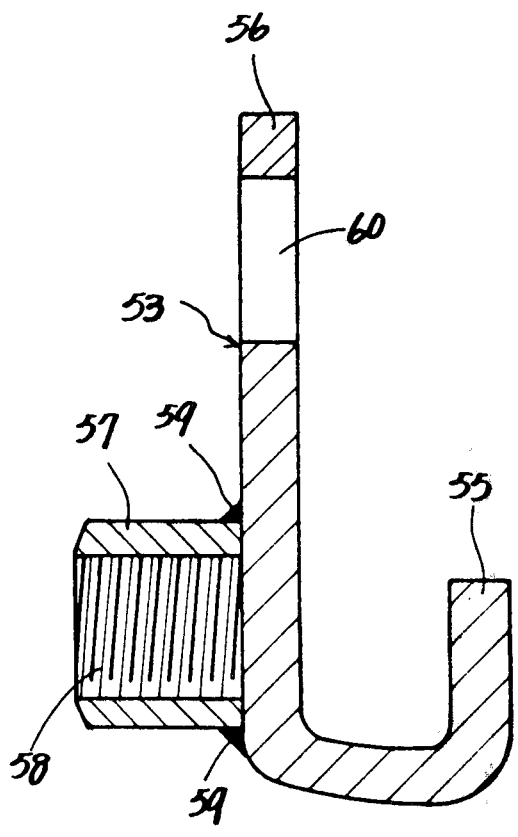

A third embodiment of this invention will now be described for holding together at least three nested pipes. With reference to FIGS. 18 to 20, a holding device 51 comprises a hook member 52 for an inner pipe $M_1$ of small diameter, a hook member 53 for an intermediate pipe $M_2$ of medium diameter, a hook member 54 for an outer pipe $M_3$ of large diameter and two bolts 61, 62 for fastening these members together. The pipes $M_1$ to $M_3$ are nested. The hook member 52 for the inner pipe is similar to the hook member 2 of the first embodiment for the inner pipe (see FIGS. 4 and 5), and the hook member 54 for the outer pipe is also similar to the hook member 3 of the first embodiment for the outer pipe (see FIGS. 6 and 7). The hook member 53 for the intermediate pipe, as seen in FIGS. 21 and 22, has a bent portion 55 and an extension 56 which resemble those of the hook member 52 and is further provided with a boss portion 57 on one side face of the bent portion 55. The boss portion 57 has a threaded bore 58 extending axially thereof. The boss portion 57 is in the form of a nut welded as at 59 to the side face of the bent portion 55. The boss portion 57 may be integral with the bent portion 55. The extension has a hole 60. A bolt 61 engageable in the threaded bore 58 of the hook member 53 for the intermediate pipe is passed through a hole 7 in the hook member 52, while a bolt 62 engageable in a threaded bore 10 in the hook member 54 for the outer pipe is passed through the hole 60 of the hook member 53. Indicated at 63 are washers.

The holding device 51 of the above construction will be used in the following manner. It is convenient to attach the device 51 to the pipes $M_1$ to $M_3$ when they are nested. At least three holding devices 51 are arranged on the pipes $M_1$ to $M_3$ as spaced apart circumferentially thereof. These pipes are nested, for example, by inserting the intermediate pipe $M_2$ and then the inner pipe $M_1$ into the outer pipe $M_3$. At this time, when the socket end of the intermediate pipe $M_2$ reaches a location close to the socket end of the outer pipe $M_3$, the hook member 54 is engaged with the flange n of the outer pipe $M_3$ and temporarily held to the outer pipe with adhesive tape, magnet member or the like. If the bent portion 8 of the hook member 54 is covered with resin sheets over the inner and outer surfaces, the sheets will protect the coating on the intermediate pipe $M_2$ and also serve to temporarily hold the hook member 54 by virtue of the elasticity of the sheets. Subsequently the intermediate pipe $M_2$ is moved until the hook member 54 for the outer pipe comes into contact with an outer surface shoulder portion 1 of the intermediate pipe $M_2$. The hook member 53 is then fitted to the flange n on the intermediate pipe $M_2$, and the hook member 53 is secured to the hook member 54 with the bolt 62. The inner pipe $M_1$ is thereafter placed into the pipe $M_2$, the hook member 52 is engaged with the flange n on the inner pipe $M_1$, and the hook member 52 is secured to the hook member 53 on the pipe $M_2$ with the bolt 61. As in the case of the foregoing embodiment, spacers 13 are placed between the opposed inner and outer surfaces of the pipes $M_1$ to $M_3$ at a location near the other ends thereof, as circumferentially suitably spaced apart.

With the holding devices 51 thus installed, the bent portion 8 of the hook member 54 for the outer pipe is in engagement with opposite side faces of the flange n of the outer pipe $M_3$ and with the shoulder portion 1 of the intermediate pipe $M_2$, while the hook member 53 for the intermediate pipe secured to the hook member 54 by the bolt 62 is at least in engagement with the end face of the intermediate pipe $M_2$, whereby the outer pipe $M_3$ and the intermediate pipe $M_2$ can be reliably held together free of any radial or axial backlash. Further since the hook member 53 is in engagement with an outer peripheral shoulder portion 1 of the inner pipe $M_1$ and the hook member 52 secured to the hook member 53 by the bolt 61 is at least in engagement with the end face of the inner pipe $M_1$, the intermediate pipe $M_2$ and the inner pipe $M_1$ can also be held together effectively. Consequently the three pipes can be held together reliably. Although the hook members 52 and 53 need not always include the U-shaped bent portions 5 and 55 insofar as they are shaped to assure the foregoing function, these U-shaped bent portions, if provided, act to retain the hook members 52 and 53 themselves against turning and are engageable with the pipes with improved reliability.

FIG. 23 shows a modified embodiment including, in place of the hook member 52 for the inner pipe, an engaging member 70 having a planar plate-like engaging portion 71 engageable only with a side face of the flange n of the inner pipe $M_1$ and a retaining member 72 secured to an extension 6 and engageable with the outer surface of the inner pipe $M_1$. With this construction, the intermediate pipe $M_2$ and the inner pipe $M_1$ can also be restrained effectively from axial displacement from each other, while the retaining member 72 holds the engaging member 70 in engagement with the pipe $M_1$ against turning on the bolt 61. Also usable is an engaging member 80 having an L-shaped engaging portion 81 as seen in FIG. 24.

Although not shown, the hook member 53 for the intermediate pipe is replaceable by an engaging member engageable with the end face of the intermediate pipe and also with an outer peripheral shoulder portion of the pipe inside the intermediate pipe.

FIG. 25 shows still another modification including, in place of the hook member 54 for the outer pipe, a hook member comprising an upright portion 91 extending radially along the inner side face of the flange n, a slightly bent portion 92 engageable with the inner periphery of the flange n and an extension 93 extending outward from the bent portion 92 axially of the pipe and having a boss portion 9. The hook member 90 of this construction, although engaging the outer side face of the flange n only at an inner peripheral edge P, fully prevents the adjacent pipes from moving axially thereof relative to each other. A bolt 62 is serviceable as a stopper if adapted to extend to a location close to the outer surface of the flange n as illustrated.

Although the third embodiment has been described above for use with three nested pipes, a number of hook members 53 or engaging members for intermediate pipes may be used for four or more nested pipes, in accordance with the increase in the number of the nested pipes.

What is claimed is:
1. A device for holding nested pipes to one another comprising:
    a hook member having a bent portion engageable with a projection projecting radially inwardly from one end of an outer pipe, from opposite sides axially thereof and further engageable with an outer peripheral shoulder portion of one end of an inner pipe,
    an engaging member at least engageable with one end face of the inner pipe, and
    screw means for fastening the hook member and the engaging member to each other.

2. A device as defined in claim 1 wherein the hook member is substantially U-shaped, and the screw means has one element fixedly joined to the outer surface of one free end of the hook member with its axis positioned perpendicular to the outer surface.

3. A device as defined in claim 1 wherein the hook member has an extension extending from one end of the bent portion outward axially of the pipe to a position close to the engaging member and having one element of the screw means fixedly joined to its forward end.

4. A device as defined in claim 1 wherein the hook member has an extension extending from one end of the bent portion outward axially of the pipe to a position close to the engaging member and integrally provided at its forward end with a lug having a bolt hole and engageable with one element of the screw means.

5. A device as defined in claim 1 wherein the engaging member comprises a planar plate engageable with one end face of the inner pipe and having fixedly joined thereto a member for preventing the plate from turning by engagement with the outer periphery of the inner pipe.

6. A device as defined in claim 1 wherein the engaging member is a substantially L-shaped member engageable with the outer side face and the inner periphery of an annular projection radially inwardly projecting from one end of the inner pipe.

7. A device as defined in claim 1 wherein the engaging member comprises a hook having a bent portion engageable with an annular projection radially inwardly projecting from one end of the inner pipe.

8. A device as defined in claim 1 wherein the screw means comprises a nut secured to the hook member and a bolt insertable into a bolt hole in the engaging member to engage in the nut with a head in engagement with the engaging member.

9. A device as defined in claim 1 wherein the screw means comprises a bolt having a head secured to the hook member and a shank insertable through a bolt hole in the engaging member and a nut engageable with a surface of the engaging member remote from the hook member and engageable with the bolt.

10. A device as defined in claim 1 for holding together an outer pipe, at least one intermediate pipe and an inner pipe as nested, wherein the engaging member comprises a first engaging element engageable with one end face of the intermediate pipe and a second engaging element engageable with one end face of the inner pipe, the first engaging element having an engaging portion at least engageable with an outer peripheral shoulder portion of one end of another intermediate pipe positioned inside said intermediate pipe or of the inner pipe.

11. A device as defined in claim 10 wherein the engaging portion of the first engaging element is U-shaped and engageable with a projection radially inwardly projecting from one end of the intermediate pipe from opposite sides axially thereof.

12. A device as defined in claim 10 wherein the first engaging element has fixedly joined thereto one element of screw means for fastening to the first engaging element another first engaging element or the second engaging element engageable with one end face of the pipe positioned inside said intermediate pipe.

* * * * *

UNITED STATES PATENT AND TRADEMARK OFFICE
CERTIFICATE OF CORRECTION

PATENT NO. : 4,250,928
DATED : February 17, 1981
INVENTOR(S) : MUNEHIRO NISHIKAWA It is certified that error appears in the above—identified patent and that said Letters Patent is hereby corrected as shown below:

Title page, under "[75] Inventor:", "Ichikawa" should read -- Chiba-ken --;

Column 1, line 43, after "and" insert -- an --;

Column 1, line 54, after "and" insert -- is --;

Column 3, line 20, before "a" (second occurrence) insert -- in --;

Column 3, line 31, "and" (second occurrence) should read -- an --;

Column 3, line 33, "bend" should read -- bent --;

Column 6, line 59, "as" should read -- and --.

Signed and Sealed this

Twenty-sixth Day of May 1981

[SEAL]

Attest:

RENE D. TEGTMEYER

Attesting Officer    Acting Commissioner of Patents and Trademarks